March 28, 1939.                G. C. PEARSON                    2,152,150
                              QUARRY DRILL FRAME
                              Filed May 9, 1938         2 Sheets-Sheet 1
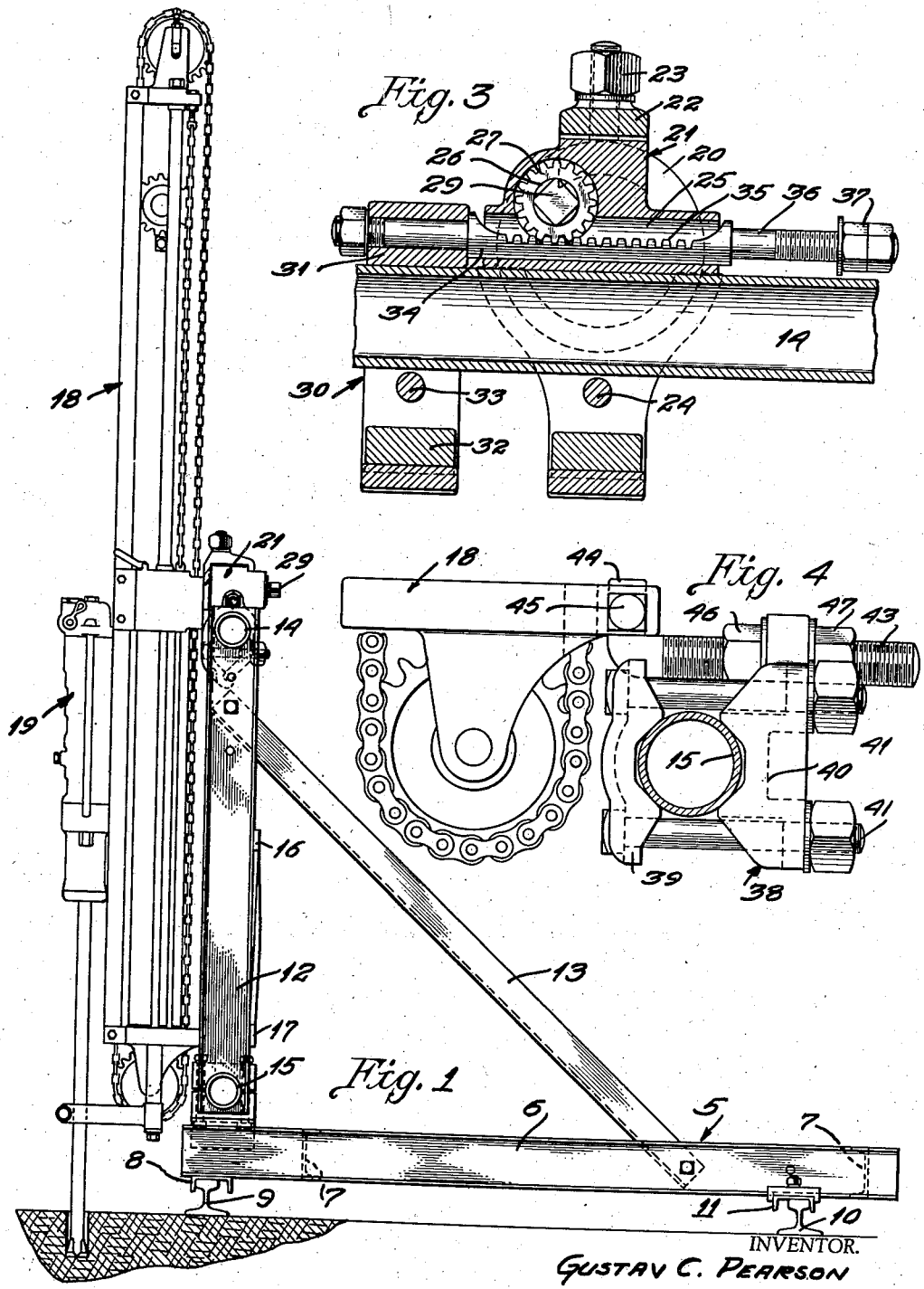
INVENTOR.
GUSTAV C. PEARSON
BY
ATTORNEY.

March 28, 1939.   G. C. PEARSON   2,152,150
QUARRY DRILL FRAME
Filed May 9, 1938   2 Sheets-Sheet 2
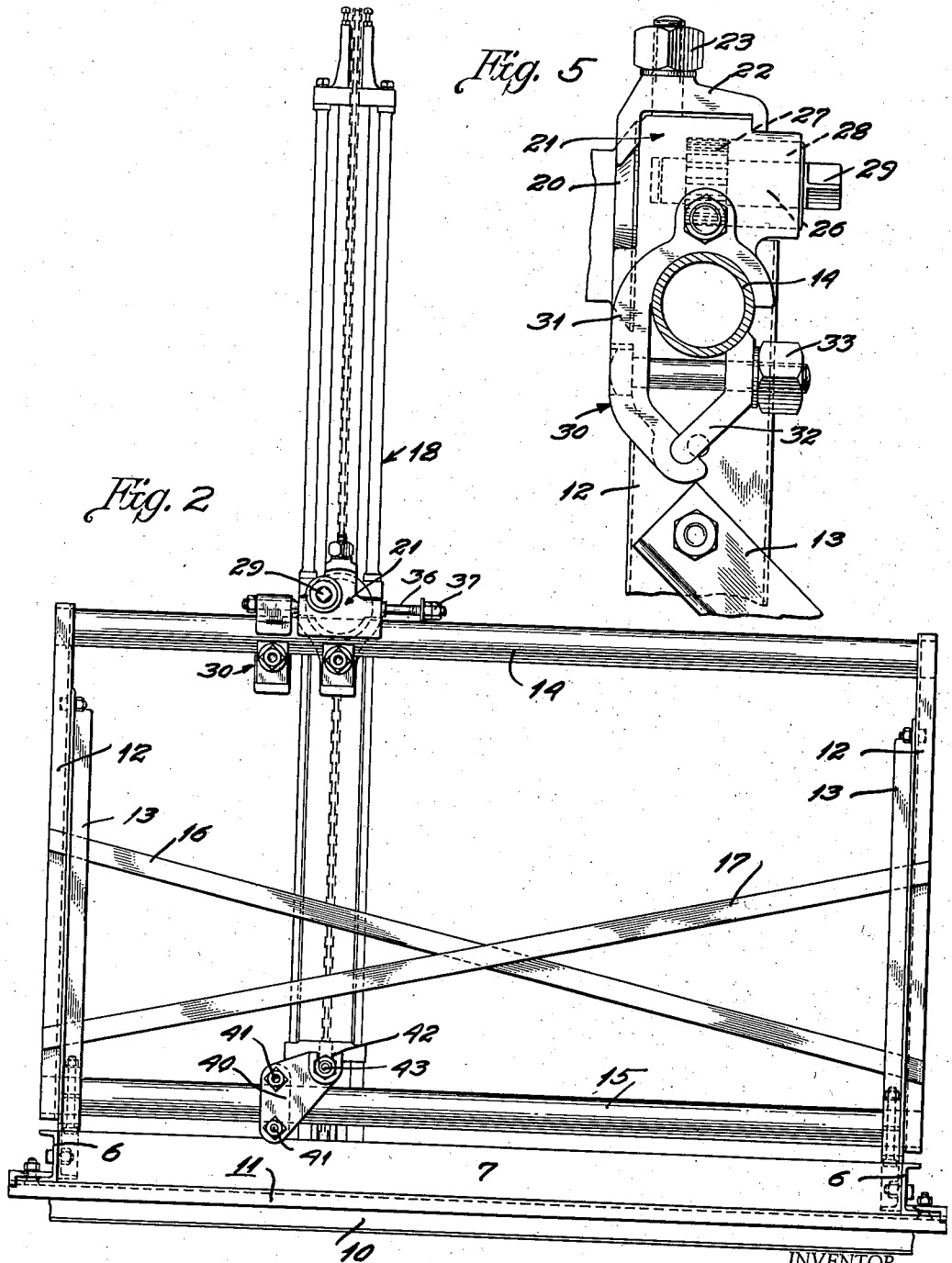
INVENTOR.
GUSTAV C. PEARSON
BY
ATTORNEY.

Patented Mar. 28, 1939

2,152,150

UNITED STATES PATENT OFFICE 2,152,150

QUARRY DRILL FRAME

Gustav C. Pearson, Denver, Colo., assignor to Gardner-Denver Company, Quincy, Ill., a corporation of Delaware Application May 9, 1938, Serial No. 206,958

6 Claims. (Cl. 255—51)

This invention relates to improvements in quarry drills and is more particularly directed to means for supporting the drill so that the same might be moved within predetermined limits upon its support.

In quarry drills it is customary to mount the drill for horizontal movement upon a support so that holes, either perpendicularly or at any angle, might be drilled in a row and at a certain distance apart. It frequently happens that the depth of the hole varies necessitating the constant change of steel. The present invention provides means whereby the drill might be withdrawn from the steel and shifted horizontally, permitting the withdrawal of the steel from the hole.

The invention further contemplates provision of means adjustably mounted upon any horizontal bar to control the movement of the drill in a horizontal direction.

Another object of the invention is to provide means for moving the drill horizontally upon the bar.

Further objects of the invention will hereinafter appear, and to all of these ends the invention consists of the features of construction, arrangement of parts, and combination of elements, substantially as hereinafter fully described and claimed in the specification and shown in the accompanying drawings, in which:—

Figure 1 is a side elevation showing the quarry frame with a suitable drilling motor and its feeding means mounted thereon.

Figure 2 is a rear elevation of Figure 1.

Figure 3 is an enlarged detailed view showing the means for moving the drill upon its supporting bar and limiting the length of its movement.

Figure 4 is an enlarged view showing the manner of connecting the lower end of the drill carriage to the quarry frame, and Figure 5 is a side elevation of Figure 3.

Briefly, the invention described hereinafter relates to a quarry frame including a horizontal bar upon which a rock drill may be mounted for horizontal movement and within a certain predetermined limit. It is customary in drills of this type to provide a supporting element for the drill whereby a series of holes might be drilled in a straight line at a certain distance apart. Heretofore, suitable means have been provided but their structures are so complicated and expensive to manufacture that production is prohibitive, due principally to the fact that the supporting bar includes a continuous rack forming a part of the means for moving the drill. In the present structure a clamp is provided for the drill carriage having a separate rack bar engageable by a gear supported by the clamping means for the carriage of the rock drill. By movement of the gear with respect to the rack bar the required adjustment of the drill is made. Progressive steps of the clamp upon the horizontal bar permit continual movement of the rock drill from one end of the supporting bar to the other.

In the accompanying drawings the numeral 5 designates in general the base of a quarry frame rectangular in shape, formed of channel iron and comprising side members 6 connected by transverse members 7. The underfaces of these side members 6 are connected at their front ends by a permanent U-shaped channel 8 which is adapted to fit over one rail 9 of a track, the other rail 10 being engageable by a second U-shaped element 11 adjustably connected at the other ends of the side members 6. Thus with this structure the base of the supporting frame might be positioned upon tracks of varying widths.

The front ends of the side members 6 have pivotally connected thereto in any suitable manner, preferably so that they might be detached, upstanding channels 12 which are braced and held at any desired angle by diagonal arms 13 connected adjacent the upper ends of the channels 12 and approximately midway of the sides 6.

Extending between the upstanding channels 12 are horizontal bars 14 and 15, the former being detachably mounted in the extreme end portions of the channels 12, while the latter is mounted in a similar way in the lower portions of the channels 12 adjacent their connections with the side elements 6. Further rigidity is given the structure by diagonally positioned braces 16 and 17 connected to the rear edge of the upstanding channels 12.

With the structure just described there is provided a suitable frame formed of channel iron including horizontally disposed bars upon which suitable elements are provided for connecting a drill supporting carriage thereto.

It is, of course, understood that with this type of frame any suitable feeding mechanism might be employed for moving the drill vertically with respect to the frame so that holes of any desired depth might be drilled. In the drawings there is disclosed a feeding mechanism whereby the drill moves at a speed greater than that of its feeding element. Such a mechanism being disclosed in the patent to Katterjohn, No. 1,971,685 of August 28, 1934. In this specific instance the feeding mechanism and its carriage is designated generally by the numeral 18, while the drill is indicated at 19. As shown in Figure 5, the carriage 18 is provided with the usual cone 20 receivable within a saddle 21 and maintained thereto by a detachable arm 22 connected to the saddle by a clamping bolt 23.

The saddle 21 is positioned upon the horizontal bar 14 and clamped thereto in any convenient manner, preferably by a removable arm engageable with a depending portion of the saddle and forced in contact with the bar 14 by a clamping bolt 24.

The saddle 21 is provided with a horizontally disposed bore 25 and positioned at right angles to this bore is a shaft 26 having rigidly connected thereto a gear 27, a portion of which extends into the bore 25. One end of the shaft extends through a suitable bushing 28 and squared, as at 29, for the reception of a wrench or a hand lever by which the shaft and its gear might be rotated.

Also adjustably mounted upon the horizontal bar 14 is a clamp 30 of a structure similar to that of the saddle, and as shown in Figure 5 it comprises a substantially U-shaped arm 31 having a depending leg with which the lower end of an arm 32 is engageable. The upper end of the arm 32 being forced in contact with the horizontal bar by a clamping bolt and nut indicated at 33. Thus it will be observed that this clamp might be positioned upon the bar 14 and secured thereto at any desired point. It is of course intended, during operation, that the clamp 30 assume a position adjacent that of the saddle 21.

The upper portion of the clamp arm 31 has detachably connected thereto an outwardly extending arm 34 upon the upper face of which is formed a rack 35 adapted to pass through the bore 25 of the saddle 21. Assuming that the clamp 30 and the saddle 21 are in relation to each other as shown in Figure 3, it will be observed that the rack bar 34 is engaged by the gear 27 and upon rotation of the gear shaft 26 movement of the saddle upon the bar, and with respect to the rack, is accomplished.

To limit the movement of the saddle 21 upon the bar 14, the rack bar 34 is provided at its free end with a threaded extension 36 having thereon adjusting nuts 37 serving as an abutment against which the saddle 21 strikes when the limit of its desired movement is reached.

To support the lower end of the drill carriage 18, the horizontal bar 15 has adjustable thereupon a suitable clamping element indicated generally at 38. This clamping element is composed of two arms 39 and 40 secured upon the bar 15 by bolts 41. The arm 40 is provided with an outward extension, as shown in Figure 2, the upper face being bifurcated as at 42 for the reception of a threaded stem 43. This threaded stem 43 has its end 44 bent up at right angles and receivable within a slot formed in the lower end of the carriage 18 and detachably secured by a setscrew or the like 45. Adjustable upon the threaded stem 43 are nuts 46 and 47 which bind upon the sides of the furcation 42. Thus providing means whereby the lower end of the drill frame 18 might be drawn inwardly toward the horizontal bar 15 or moved outwardly therefrom at any desired angle, governed of course by the length of the stem 43.

Assuming now that the quarry frame as disclosed in Figures 1 and 2 is supporting a rock drill and its feeding means and that the same is being used for the drilling of a number of holes in a straight line. Such holes may be at any desired angle and such is permitted by the pivotal movement of the channels 12 upon the base frame 5. The channels being held at the desired angle by the adjustable braces 13. After the completion of the first hole the operator desires to move the drill to a new position for the drilling of the second hole, the drill 19 is first drawn upwardly of its carriage 18, either carrying with it its steel or leaving the steel in the hole. Assuming now that the operator desires to drill a second hole parallel to the first, the clamping bolt 24 of the saddle 21 is loosened and by rotating the shaft 26 the gear 27 accordingly rotates, as the gear 27 travels along the rack 35 movement of the saddle 21 upon the bar 14 is accomplished, the distance of travel being regulated by the relation of the abutting nut 37 upon the threaded end of the rack. When the drill has assumed its new position the bolt 24 is tightened and then the clamping bolt 33 of the clamp 30 is loosened, permitting the clamp 30 to be moved manually to a position abutting the saddle 21. The clamping bolt 33 is then tightened leaving the rack bar in its new position with relation to the saddle 21 for further movement of the saddle upon the completion of the second hole.

It is, of course, understood that in this adjustment of the drill carriage with respect to the horizontal bar 14 a suitable adjustment must be made of the means supporting and connecting the lower end of the drill carriage 18 to the quarry frame.

In the operation of a quarry drill it frequently becomes necessary to change steel during the drilling of a hole and with the structure herein described the same can be very readily accomplished by moving the drill upwardly of its carriage and then moving the carriage horizontally upon the bar by rotation of the shaft 26. The old steel is then withdrawn from the hole and a new steel is inserted. The carriage then is returned to its former position and the drill lowered so that the end of the steel might be received within the chuck end of the drill. The various clamps for the carriage are then tightened leaving the mechanism and drill in a position for a continuation of the drilling.

The structure herein described includes manually clamping means for both the saddle 21 and the clamp carrying the rack 34. It is understood that any suitable clamping means may be provided, as an example, fluid operated means might be substituted.

From the foregoing it is thought that the construction, operation and many advantages of the herein described invention will be apparent to those skilled in the art without further description, and it will be understood that various changes in the size, shape, proportion and minor details of construction may be resorted to without department from the spirit or sacrificing any of the advantages of the invention.

What I claim is:

1. In a quarry frame, the combination of a bar and a drill supported thereby, a saddle securing the drill to the bar, an element secured to the bar, coacting means carried by both the saddle and element for moving the drill with respect to the bar, and adjustable means limiting the movement of the drill upon the bar.

2. A quarry frame including spaced horizontal bars lying in a common plane, a drill carriage, means carried by one of the bars for detachably securing the carriage thereto at any desired angle, means movable upon the other bar for connection with the carriage, and the last said means serving to hold the carriage at an angle outwardly from the bar.

3. A quarry frame including spaced horizontal bars, a drill carriage movable thereupon, means carried by one of the bars for detachably securing the carriage thereto at any desired angle, means movable upon the other bar and detachably connected to the carriage, and the last said means serving to hold the carriage at any angle from the plane formed by the bars.

4. In a quarry frame, the combination of a bar and a drill supported thereby, a saddle securing the drill to the bar, a clamp adjacent the saddle, coacting elements carried by both saddle and clamp for moving the drill longitudinally of the bar, and one of the elements provided with adjustable means for regulating the length of the drill movement.

5. In a quarry frame, the combination of a bar and a drill supported thereby, a saddle securing the drill to the bar, a clamp adjacent the saddle, a rotatable element carried by the saddle, a rack bar carried by the clamp and engageable by the rotatable element for moving the drill longitudinally of the bar, and said rack bar provided with stops for limiting the movement of the gear thereupon.

6. A quarry frame including spaced horizontal bars, a drill carriage, a saddle securing the carriage to one of the bars, a rotatable gear carried by the saddle, a clamp adjacent the saddle and provided with a rack engageable by the gear whereby movement of the gear upon the rack moves the carriage longitudinally upon the bar, and said rack being provided with adjustable elements to regulate the length of the carriage movement.

GUSTAV C. PEARSON.